United States Patent
Kim et al.

(10) Patent No.: US 10,527,132 B2
(45) Date of Patent: Jan. 7, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Hwaseong-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 15/946,199

(22) Filed: Apr. 5, 2018

(65) Prior Publication Data
    US 2019/0195318 A1  Jun. 27, 2019

(30) Foreign Application Priority Data
    Dec. 21, 2017 (KR) .................. 10-2017-0177097

(51) Int. Cl.
    *F16D 3/66*     (2006.01)
    *F16H 3/66*     (2006.01)
(52) U.S. Cl.
    CPC ....... *F16H 3/66* (2013.01); *F16H 2200/0069* (2013.01); *F16H 2200/2015* (2013.01); *F16H 2200/2046* (2013.01)

(58) Field of Classification Search
    CPC combination set(s) only.
    See application file for complete search history.

(56) References Cited

U.S. PATENT DOCUMENTS 9,506,533 B2 * 11/2016 Park .................. F16H 3/666
2018/0328456 A1 * 11/2018 Kim .................... F16H 3/62

FOREIGN PATENT DOCUMENTS

WO    WO-2018197127 A1 * 11/2018 ............... F16H 3/66

* cited by examiner

*Primary Examiner* — Charles A Fox
*Assistant Examiner* — Ryan P Dodd
(74) *Attorney, Agent, or Firm* — Morgan, Lewis & Bockius LLP

(57) ABSTRACT

A planetary gear train apparatus of automatic transmission may include first planetary gear set including first to third rotation elements, second planetary gear set including fourth to sixth rotation elements, third planetary gear set including seventh to ninth rotation elements, fourth planetary gear set including tenth to twelfth rotation elements, fifth planetary gear set including thirteenth to fifteenth rotation elements, first shaft fixed to the second rotation element and the input shaft, second shaft fixed to the fourteenth rotation element and the output shaft, third shaft fixed to the third and seventh rotation elements, fourth shaft fixed to the fifth and thirteenth rotation elements, fifth shaft fixed to the sixth rotation element, sixth shaft fixed to the eleventh and fifteenth rotation elements, seventh shaft fixed to the first, fourth, and eighth rotation elements, eighth shaft fixed to the ninth and tenth rotation elements, and ninth shaft fixed to the twelfth rotation element.

19 Claims, 3 Drawing Sheets

FIG. 2

| Speed stages | Engaging elements | | | | | | Gear ratio | Step ratio | Note |
|---|---|---|---|---|---|---|---|---|---|
| | C1 | C2 | C3 | B1 | B2 | B3 | | | |
| D1 | ● | | | ● | | ● | 5.960 | — | Gear ratio span :9.7 Ratio of R/D1 :0.83 |
| | | | | | | | | 1.558 | |
| D2 | | ● | | ● | | ● | 3.825 | | |
| | | | | | | | | 1.430 | |
| D3 | | ● | | | ● | ● | 2.675 | | |
| | | | | | | | | 1.434 | |
| D4 | ● | ● | | | | ● | 1.865 | | |
| | | | | | | | | 1.266 | |
| D5 | | ● | ● | | | ● | 1.473 | | |
| | | | | | | | | 1.196 | |
| D6 | ● | | ● | | | ● | 1.232 | | |
| | | | | | | | | 1.232 | |
| D7 | ● | ● | ● | | | | 1.000 | | |
| | | | | | | | | 1.148 | |
| D8 | ● | | ● | | ● | | 0.871 | | |
| | | | | | | | | 1.190 | |
| D9 | | ● | ● | | ● | | 0.732 | | |
| | | | | | | | | 1.186 | |
| D10 | | ● | ● | ● | | | 0.617 | — | |
| REV | | | ● | ● | | ● | -4.948 | | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0177097 filed on Dec. 21, 2017, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving ten forward speeds and widening speed ratio span (or gear ratio span), and secures linearity of step ratios.

Description of Related Art

An automatic transmission achieving more speed stages has been developed to enhancing fuel economy and optimizing drivability.

Such an automatic transmission achieving more speed stages is necessary to maximize power performance and driving efficiency according to downsizing of an engine. It is desperately demanded to develop high efficiency multiple-speeds transmissions having excellent linearity of step ratios that may be used as an index closely related to drivability including acceleration before and after shift and rhythmical engine speed to secure competitiveness of automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may achieve maximum efficiency with a small number of components may be important to increase fuel efficiency enhancement effect through the multiple-speeds.

In the present background, an eight-speed automatic transmission has been introduced recently and a planetary gear train for an automatic transmission facilitating more speed stages is under investigation.

However, since a conventional eight-speed automatic transmission has gear ratio span of 6.5-7.5 (gear ratio span is an important factor for securing linearity of step ratios), improvement of power performance and fuel economy may not be great.

Furthermore, even though an eight-speed automatic transmission has gear ratio span greater than 9.0, it is hard to secure linearity of step ratios. Therefore, driving efficiency of an engine and drivability of a vehicle may deteriorate, and thus, development of high efficiency automatic transmissions which achieve at least nine forward speeds is necessary.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving ten forward speeds and one reverse speed and reducing drag loss of clutches and brakes using five planetary gear sets but six engaging elements.

Various aspects of the present invention are directed to providing a planetary gear train of an automatic transmission for a vehicle having further advantages of improving torque delivery efficiency and durability by applying torque parallel way to a planetary gear set at an output side and minimizing torque share of each planetary gear set and each engaging element.

Various aspects of the present invention are directed to providing a high-efficiency planetary gear train of an automatic transmission for a vehicle having further advantages of increasing flexibility of output gear ratios and improving linearity of step ratios by use of five planetary gear sets for achieving ten forward speeds and one reverse speed.

A planetary gear train of an automatic transmission for a vehicle according to an exemplary embodiment of the present invention may include: an input shaft receiving torque of an engine; an output shaft outputting torque; a first planetary gear set including first, second and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements; a first shaft fixedly connected to the second rotation element and the input shaft; a second shaft fixedly connected to the fourteenth rotation element and the output shaft; a third shaft fixedly connected to the third rotation element and the seventh rotation element; a fourth shaft fixedly connected to the fifth rotation element and the thirteenth rotation element; a fifth shaft fixedly connected to the sixth rotation element; a sixth shaft fixedly connected to the eleventh rotation element and the fifteenth rotation element; a seventh shaft fixedly connected to the first rotation element, the fourth rotation element, and the eighth rotation element; an eighth shaft fixedly connected to the ninth rotation element and the tenth rotation element; and a ninth shaft fixedly connected to the twelfth rotation element.

The planetary gear train may further include six engaging elements, each selectively connecting any one shaft with another shaft or any one shaft with a transmission housing, wherein forward speeds or reverse speeds are achieved by operating three engaging elements among the six engaging elements.

The six engaging elements may include: three clutches, each selectively connecting any two shafts among the nine shafts; and three brakes, each selectively connecting any one shaft among the nine shafts which is not connected to the input shaft nor the output shaft with the transmission housing.

The six engaging elements may include: a first clutch disposed between the first shaft and the fourth shaft; a second clutch disposed between the third shaft and the fourth shaft; a third clutch disposed between the fifth shaft and the sixth shaft; a first brake disposed between the seventh shaft and the transmission housing; a second brake disposed between the eighth shaft and the transmission housing; and a third brake disposed between the ninth shaft and the transmission housing.

The first rotation element may be a first sun gear, the second rotation element may be a first planet carrier, and the third rotation element may be a first ring gear. The fourth rotation element may be a second sun gear, the fifth rotation element may be a second planet carrier, and the sixth rotation element may be a second ring gear. The seventh rotation element may be a third sun gear, the eighth rotation element may be a third planet carrier, and the ninth rotation element may be a third ring gear. The tenth rotation element may be a fourth sun gear, the eleventh rotation element may be a fourth planet carrier, and the twelfth rotation element may be a fourth ring gear. The thirteenth rotation element may be a fifth sun gear, the fourteenth rotation element may be a fifth planet carrier, and the fifteenth rotation element may be a fifth ring gear.

In one aspect, the first, second, third, fourth, and fifth planetary gear sets may be disposed in a sequence of the first, third, fourth, second, and fifth planetary gear sets from an engine side on an axis of the input shaft.

In another aspect, the first, second, third, fourth, and fifth planetary gear sets may be disposed in a sequence of the first, third, second, fourth, and fifth planetary gear sets from an engine side on an axis of the input shaft.

A planetary gear train of an automatic transmission for a vehicle according to an exemplary embodiment of the present invention may include: an input shaft receiving torque of an engine; an output shaft outputting torque; a first planetary gear set including first, second and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements; a first shaft fixedly connected to the second rotation element and the input shaft; a second shaft fixedly connected to the fourteenth rotation element and the output shaft; a third shaft fixedly connected to the third rotation element and the seventh rotation element; a fourth shaft fixedly connected to the fifth rotation element and the thirteenth rotation element; a fifth shaft fixedly connected to the sixth rotation element; a sixth shaft fixedly connected to the eleventh rotation element and the fifteenth rotation element; and a plurality of shafts formed by combinations of remaining rotation elements among the first to fifteenth rotation elements that are not connected to the first shaft to the sixth shaft, and each thereof selectively connectable to a transmission housing.

The plurality of shafts may include: a seventh shaft fixedly connected to the first rotation element, the fourth rotation element, and the eighth rotation element, and selectively connectable to the transmission housing; an eighth shaft fixedly connected to the ninth rotation element and the tenth rotation element and selectively connectable to the transmission housing; and a ninth shaft fixedly connected to the twelfth rotation element and selectively connectable to the transmission housing, wherein the first shaft is selectively connectable to the fourth shaft, the third shaft is selectively connectable to the fourth shaft, and the fifth shaft is selectively connectable to the sixth shaft.

The planetary gear train may further include: three clutches, each selectively connecting any one shaft to another shaft; and three brakes, each selectively connecting any one of the seventh shaft, the eighth shaft, and the ninth shaft to the transmission housing.

The three clutches may include: a first clutch disposed between the first shaft and the fourth shaft; a second clutch disposed between the third shaft and the fourth shaft; and a third clutch disposed between the fifth shaft and the sixth shaft.

The three brakes may include: a first brake disposed between the seventh shaft and the transmission housing; a second brake disposed between the eighth shaft and the transmission housing; and a third brake disposed between the ninth shaft and the transmission housing.

The first rotation element may be a first sun gear, the second rotation element may be a first planet carrier, and the third rotation element may be a first ring gear. The fourth rotation element may be a second sun gear, the fifth rotation element may be a second planet carrier, and the sixth rotation element may be a second ring gear. The seventh rotation element may be a third sun gear, the eighth rotation element may be a third planet carrier, and the ninth rotation element may be a third ring gear. The tenth rotation element may be a fourth sun gear, the eleventh rotation element may be a fourth planet carrier, and the twelfth rotation element may be a fourth ring gear. The thirteenth rotation element may be a fifth sun gear, the fourteenth rotation element may be a fifth planet carrier, and the fifteenth rotation element may be a fifth ring gear.

In one aspect, the first, second, third, fourth, and fifth planetary gear sets may be disposed in a sequence of the first, third, fourth, second, and fifth planetary gear sets from an engine side on an axis of the input shaft.

In another aspect, the first, second, third, fourth, and fifth planetary gear sets may be disposed in a sequence of the first, third, second, fourth, and fifth planetary gear sets from an engine side on an axis of the input shaft.

A planetary gear train of an automatic transmission for a vehicle according to other exemplary embodiment of the present invention may include: an input shaft receiving torque of an engine; an output shaft outputting torque; a first planetary gear set including first, second and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and a fifth planetary gear set including thirteenth, fourteenth, and fifteenth rotation elements, wherein the second rotation element is fixedly connected to the input shaft, the fourteenth rotation element is fixedly connected to the output shaft, the first rotation element is fixedly connected to the fourth rotation element and the eighth rotation element, and selectively connectable to a transmission housing, the third rotation element is fixedly connected to the seventh rotation element, the fifth rotation element is fixedly connected to the thirteenth rotation element and selectively connectable to the second rotation element and the seventh rotation element, the ninth rotation element is fixedly connected to the tenth rotation element and selectively connectable to the transmission housing, the eleventh rotation element is fixedly connected to the fifteenth rotation element and selectively connectable to the sixth rotation element, and the twelfth rotation element is selectively connectable to the transmission housing.

The planetary gear train may further include: three clutches, each selectively connecting any one rotation element to another rotation element; and three brakes, each selectively connecting any one of the first rotation element, the ninth rotation element, and the twelfth rotation element to the transmission housing.

The three clutches may include: a first clutch disposed between the second rotation element and the fifth rotation element; a second clutch disposed between the fifth rotation element and the seventh rotation element; and a third clutch disposed between the sixth rotation element and the eleventh rotation element.

The three brakes may include: a first brake disposed between the first rotation element and the transmission housing; a second brake disposed between the ninth rotation element and the transmission housing; and a third brake disposed between the twelfth rotation element and the transmission housing.

The first rotation element may be a first sun gear, the second rotation element may be a first planet carrier, and the third rotation element may be a first ring gear. The fourth rotation element may be a second sun gear, the fifth rotation element may be a second planet carrier, and the sixth rotation element may be a second ring gear. The seventh rotation element may be a third sun gear, the eighth rotation element may be a third planet carrier, and the ninth rotation element may be a third ring gear. The tenth rotation element may be a fourth sun gear, the eleventh rotation element may be a fourth planet carrier, and the twelfth rotation element may be a fourth ring gear. The thirteenth rotation element may be a fifth sun gear, the fourteenth rotation element may be a fifth planet carrier, and the fifteenth rotation element may be a fifth ring gear.

In one aspect, the first, second, third, fourth, and fifth planetary gear sets may be disposed in a sequence of the first, third, fourth, second, and fifth planetary gear sets from an engine side on an axis of the input shaft.

In another aspect, the first, second, third, fourth, and fifth planetary gear sets may be disposed in a sequence of the first, third, second, fourth, and fifth planetary gear sets from an engine side on an axis of the input shaft.

According to exemplary embodiments of the present invention, ten forward speeds and one reverse speed may be achieved by combining five planetary gear sets being simple planetary gear sets with six engaging elements.

Furthermore, since gear ratio span greater than 9.7 is secured, driving efficiency of the engine may be maximized. Furthermore, since linearity of step ratios may be secured due to multiple speed stages, drivability including acceleration before and after shift, rhythmical engine speed, and the like may be improved.

Furthermore, since ten forward speeds and one reverse speed are achieved by use of five planetary gear sets but the number of engaging elements is minimized, drag loss of clutches and brakes may be reduced and power delivery efficiency and fuel economy may be improved.

Furthermore, since torque parallel way is applied to a planetary gear set at an output side and a torque is evenly shared to each planetary gear set and each engaging element, torque delivery efficiency and durability may be improved.

Furthermore, since five planetary gear sets are used to achieve ten forward speeds and one reverse speed, flexibility of output gear ratios may be increased and linearity of step ratios may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of engaging elements at each speed stage in the planetary gear train according to the various exemplary embodiments of the present invention.

Figure 1:
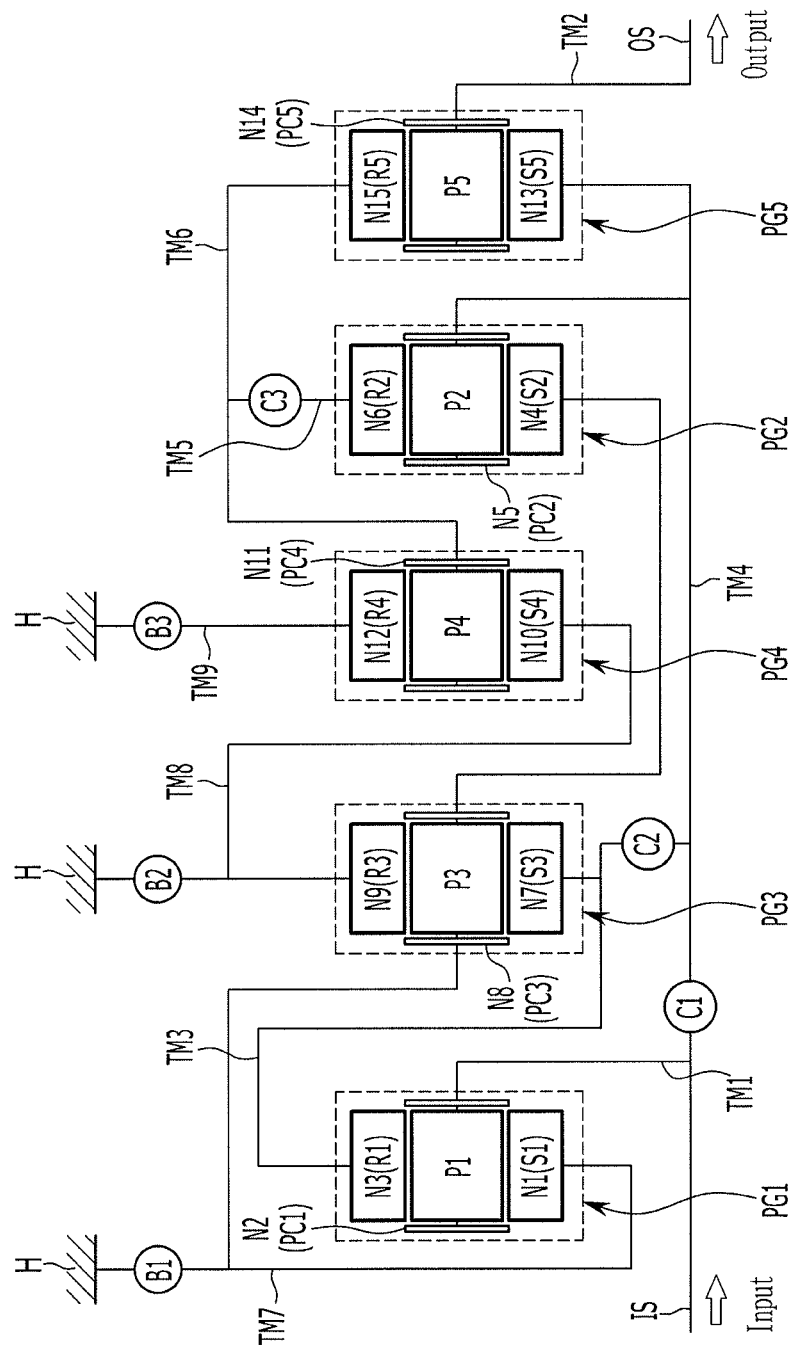
FIG. 1 is a schematic diagram of a planetary gear train according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention includes first, second, third, fourth, and fifth planetary gear sets PG1, PG2, PG3, PG4, and PG5 disposed on the same axis, an input shaft IS, an output shaft OS, nine shafts TM1 to TM9 connected to at least one rotation element of the first, second, third, fourth, and fifth planetary gear sets PG1, PG2, PG3, PG4, and PG5, engaging elements including three clutches C1 to C3 and three brakes B1 to B3, and a transmission housing H.

Torque input from an engine to the input shaft IS is changed by cooperation of the first, second, third, fourth, and fifth planetary gear sets PG1, PG2, PG3, PG4, and PG5, and the changed torque is output through the output shaft OS.

According to the various exemplary embodiments of the present invention, the planetary gear sets are disposed in a sequence of the first, third, fourth, second, and fifth planetary gear sets PG1, PG3, PG4, PG2, and PG5 from an engine side on an axis of the input shaft IS.

The input shaft IS is an input member and a torque from a crankshaft of the engine is torque-converted through a torque converter to be input into the input shaft IS.

The output shaft OS is an output element, is disposed on the same axis with the input shaft IS, and transmits driving torque to a driving wheel through a differential apparatus.

The first planetary gear set PG1 is a single pinion planetary gear set and includes a first sun gear S1 as a first rotation element N1, a first planet carrier PC1 as a second rotation element N2 that rotatably supports a plurality of first pinion gears P1 disposed evenly at an external circumference of the first sun gear S1 and engaged with the first sun gear S1, and a first ring gear R1 as a third rotation element N3 which is engaged with the first pinion gears P1 at a radial outer of the plurality of first pinion gears P1 to be operably connected to the first sun gear S1.

The second planetary gear set PG2 is a single pinion planetary gear set and includes a second sun gear S2 as a fourth rotation element N4, a second planet carrier PC2 as a fifth rotation element N5 that rotatably supports a plurality of second pinion gears P2 disposed evenly at an external circumference of the second sun gear S2 and engaged with the second sun gear S2, and a second ring gear R2 as a sixth rotation element N6 which is engaged with the second pinion gears P2 at a radial outer of the plurality of second pinion gears P2 to be operably connected to the second sun gear S2.

The third planetary gear set PG3 is a single pinion planetary gear set and includes a third sun gear S3 as a seventh rotation element N7, a third planet carrier PC3 as an eighth rotation element N8 that rotatably supports a plurality of third pinion gears P3 disposed evenly at an external circumference of the third sun gear S3 and engaged with the third sun gear S3, and a third ring gear R3 as a ninth rotation element N9 which is engaged with the third pinion gears P3 at a radial outer of the plurality of third pinion gears P3 to be operably connected to the third sun gear S3.

The fourth planetary gear set PG4 is a single pinion planetary gear set and includes a fourth sun gear S4 as a tenth rotation element N10, a fourth planet carrier PC4 as an eleventh rotation element N11 that rotatably supports a plurality of fourth pinion gears P4 disposed evenly at an external circumference of the fourth sun gear S4 and engaged with the fourth sun gear S4, and a fourth ring gear R4 as a twelfth rotation element N12 which is engaged with the fourth pinion gears P4 at a radial outer of the plurality of fourth pinion gears P4 to be operably connected to the fourth sun gear S4.

The fifth planetary gear set PG5 is a single pinion planetary gear set and includes a fifth sun gear S5 as a thirteenth rotation element N13, a fifth planet carrier PC5 as a fourteenth rotation element N14 that rotatably supports a plurality of fifth pinion gears P5 disposed evenly at an external circumference of the fifth sun gear S5 and engaged with the fifth sun gear S5, and a fifth ring gear R5 as a fifteenth rotation element N15 which is engaged with the fifth pinion gears P5 at a radial outer of the plurality of fifth pinion gears P5 to be operably connected to the fifth sun gear S5.

Here, the term "operably connected" or the like means at least two members are directly or indirectly connected to each other. However, two members that are operably connected to each other do not always rotate with the same rotation speed and in the same rotation direction thereof.

Here, the first rotation element N1 is fixedly connected to the fourth rotation element N4 and the eighth rotation element N8, the third rotation element N3 is fixedly connected to the seventh rotation element N7, the fifth rotation element N5 is fixedly connected to the thirteenth rotation element N13, the ninth rotation element N9 is fixedly connected to the tenth rotation element N10, and the eleventh rotation element N11 is fixedly connected to the fifteenth rotation element N15 such that the first, second, third, fourth, and fifth planetary gear sets PG1, PG2, PG3, PG4, and PG5 include nine shafts TM1 to TM9.

Here, the term "fixedly connected" or the like means at least two members are connected to each other to always rotate without rotation speed difference. That is, at least two members that are fixedly connected to each other always rotate with the same rotation speed and in the same rotation direction thereof. Therefore, it is to be understood by a person of an ordinary skill in the art that the term "fixedly connected" or the like differs from the term "operably connected" or the like.

The nine shafts TM1 to TM9 will be described in further detail.

The first shaft TM1 is fixedly connected to the second rotation element N2 (first planet carrier PC1) and fixedly connected to the input shaft IS to be continuously operated as an input element.

The second shaft TM2 is fixedly connected to the fourteenth rotation element N14 (fifth planet carrier PC5) and fixedly connected to the output shaft OS to be continuously operated as an output element.

The third shaft TM3 is fixedly connected to the third rotation element N3 (first ring gear R1) and the seventh rotation element N7 (third sun gear S3).

The fourth shaft TM4 is fixedly connected to the fifth rotation element N5 (second planet carrier PC2) and the thirteenth rotation element N13 (fifth sun gear S5).

The fifth shaft TM5 is fixedly connected to the sixth rotation element N6 (second ring gear R2).

The sixth shaft TM6 is fixedly connected to the eleventh rotation element N11 (fourth planet carrier PC4) and the fifteenth rotation element N15 (fifth ring gear R5).

The seventh shaft TM7 is fixedly connected to the first rotation element N1 (first sun gear S1), the fourth rotation element N4 (second sun gear S2), and the eighth rotation element N8 (third planet carrier PC3).

The eighth shaft TM8 is fixedly connected to the ninth rotation element N9 (third ring gear R3) and the tenth rotation element N10 (fourth sun gear S4).

The ninth shaft TM9 is fixedly connected to the twelfth rotation element N12 (fourth ring gear R4).

The nine shafts TM1 to TM9 fixedly connects a plurality of rotation elements among the rotation elements of the planetary gear sets PG1, PG2, PG3, PG4, and PG5 with each other, are rotation members that are connected to any one rotation element and rotate with the any one rotation element to transmit torque, are rotation members that selectively connect any one rotation element with the transmission housing H, or are fixed members that directly connect any one rotation element to the transmission housing H.

Here, the term "selectively connectable" or the like means that a plurality of shafts including the input shaft and the output shaft are connectable to each other through at least one of the engaging elements to rotate with the same rotation speed and in the same rotation direction thereof, or are connectable to the transmission housing through at least one of the engaging elements to be fixed to the transmission housing.

In other words, in a case that the engaging element selectively connects a plurality of shafts to each other, the plurality of shafts rotate with the same rotation speed and in the same rotation direction when the engaging element operates but the plurality of shafts are disconnected from each other when the engaging element is released.

Furthermore, in a case that the engaging element selectively connects any one shaft to the transmission housing, the corresponding shaft is fixedly connected to the transmission housing when the engaging element operates but the corresponding shaft is rotatable when the engaging element is released.

Therefore, it is to be understood by a person of an ordinary skill in the art that the term "selectively connectable" or the like differs from the term "operably connected" or the like.

Here, the first shaft TM1 and the third shaft TM3 are selectively connectable to the fourth shaft TM4, and the fifth shaft TM5 is selectively connectable to the sixth shaft TM6.

Furthermore, each of the seventh shaft TM7, the eighth shaft TM8, and ninth shaft TM9 is selectively connectable to the transmission housing H to be operated as a selective fixed element.

Three clutches C1, C2, and C3 that are engaging elements are disposed at portions at which any two shafts among the nine shafts TM1 to TM9 including the input shaft IS and the output shaft OS are selectively connectable to each other.

Furthermore, three brakes B1, B2, and B3 that are engaging elements are disposed at portions at which any one shaft among the nine shafts TM1 to TM9 is selectively connectable to the transmission housing H.

Arrangement of the six engaging elements (three clutches C1 to C3 and three brakes B1 to B3) will be described more specifically.

The first clutch C1 is disposed between the first shaft TM1 and the fourth shaft TM4 and selectively connects the first shaft TM1 to the fourth shaft TM4.

The second clutch C2 is disposed between the third shaft TM3 and the fourth shaft TM4 and selectively connects the third shaft TM3 to the fourth shaft TM4.

The third clutch C3 is disposed between the fifth shaft TM5 and the sixth shaft TM6 and selectively connects the fifth shaft TM5 to the sixth shaft TM6.

The first brake B1 is disposed between the seventh shaft TM7 and the transmission housing H and selectively connects and fixes the seventh shaft TM7 to the transmission housing H.

The second brake B2 is disposed between the eighth shaft TM8 and the transmission housing H and selectively connects and fixes the eighth shaft TM8 to the transmission housing H.

The third brake B3 is disposed between the ninth shaft TM9 and the transmission housing H and selectively connects and fixes the ninth shaft TM9 to the transmission housing H.

The engaging elements including the first, second and third clutches C1, C2, and C3 and the first, second and third brakes B1, B2, and B3 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control device can be configured as the engaging elements.

FIG. 2 is an operation chart of engaging elements at each speed stage in the planetary gear train according to the various exemplary embodiments of the present invention.

Referring to FIG. 2, any three combinations among the first, second and third clutches C1, C2, and C3 and the first, second and third brakes B1, B2, and B3 are operated to achieve ten forward speeds and one reverse speed. Shifting processes will be described.

The first clutch C1 and the first and third brakes B1 and B3 are operated at a first forward speed D1.

In a state that the first shaft TM1 is fixedly connected to the fourth shaft TM4 by operation of the first clutch C1, torque of the input shaft IS is input to the first shaft TM1.

At the present state, the seventh and ninth shafts TM7 and TM9 are operated as the fixed elements by operation of the first and third brakes B1 and B3. Therefore, the torque of the input shaft IS is shifted into the first forward speed, and the first forward speed is output through the output shaft OS fixedly connected to the second shaft TM2.

The second clutch C2 and the first and third brakes B1 and B3 are operated at a second forward speed D2.

In a state that the third shaft TM3 is fixedly connected to the fourth shaft TM4 by operation of the second clutch C2, the torque of the input shaft IS is input to the first shaft TM1.

At the present state, the seventh and ninth shafts TM7 and TM9 are operated as the fixed elements by operation of the first and third brakes B1 and B3. Therefore, the torque of the input shaft IS is shifted into the second forward speed, and the second forward speed is output through the output shaft OS fixedly connected to the second shaft TM2.

The second clutch C2 and the second and third brakes B2 and B3 are operated at a third forward speed D3.

In a state that the third shaft TM3 is fixedly connected to the fourth shaft TM4 by operation of the second clutch C2, the torque of the input shaft IS is input to the first shaft TM1.

At the present state, the eighth and ninth shafts TM8 and TM9 are operated as the fixed elements by operation of the second and third brakes B2 and B3. Therefore, the torque of the input shaft IS is shifted into the third forward speed, and the third forward speed is output through the output shaft OS fixedly connected to the second shaft TM2.

The first clutch and second clutch C1 and C2 and the third brake B3 are operated at a fourth forward speed D4.

In a state that the first shaft TM1 is fixedly connected to the fourth shaft TM4 by operation of the first clutch C1 and the third shaft TM3 is fixedly connected to the fourth shaft TM4 by operation of the second clutch C2, the torque of the input shaft IS is input to the first shaft TM1.

At the present state, the ninth shaft TM9 is operated as the fixed element by operation of the third brake B3. Therefore, the torque of the input shaft IS is shifted into the fourth forward speed, and the fourth forward speed is output through the output shaft OS fixedly connected to the second shaft TM2.

The second and third clutches C2 and C3 and the third brake B3 are operated at a fifth forward speed D5.

In a state that the third shaft TM3 is fixedly connected to the fourth shaft TM4 by operation of the second clutch C2 and the fifth shaft TM5 is fixedly connected to the sixth shaft TM6 by operation of the third clutch C3, the torque of the input shaft IS is input to the first shaft TM1.

At the present state, the ninth shaft TM9 is operated as the fixed element by operation of the third brake B3. Therefore, the torque of the input shaft IS is shifted into the fifth forward speed, and the fifth forward speed is output through the output shaft OS fixedly connected to the second shaft TM2.

The first and third clutches C1 and C3 and the third brake B3 are operated at a sixth forward speed D6.

In a state that the first shaft TM1 is fixedly connected to the fourth shaft TM4 by operation of the first clutch C1 and the fifth shaft TM5 is fixedly connected to the sixth shaft TM6 by operation of the third clutch C3, the torque of the input shaft IS is input to the first shaft TM1.

At the present state, the ninth shaft TM9 is operated as the fixed element by operation of the third brake B3. Therefore, the torque of the input shaft IS is shifted into the sixth forward speed, and the sixth forward speed is output through the output shaft OS fixedly connected to the second shaft TM2.

The first, second and third clutches C1, C2, and C3 are operated at a seventh forward speed D7.

Therefore, the first shaft TM1 is fixedly connected to the fourth shaft TM4 by operation of the first clutch C1, the third shaft TM3 is fixedly connected to the fourth shaft TM4 by operation of the second clutch C2, and the fifth shaft TM5 is fixedly connected to the sixth shaft TM6 by operation of the third clutch C3.

In the instant case, the first, second, third, fourth, and fifth planetary gear sets PG1, PG2, PG3, PG4, and PG5 become lock-up states. Therefore, the torque of the input shaft IS input to the first shaft TM1 is output through the output shaft OS fixedly connected to the second shaft TM2 without rotation speed change.

The first and third clutches C1 and C3 and the second brake B2 are operated at an eighth forward speed D8.

In a state that the first shaft TM1 is fixedly connected to the fourth shaft TM4 by operation of the first clutch C1 and the fifth shaft TM5 is fixedly connected to the sixth shaft TM6 by operation of the third clutch C3, the torque of the input shaft IS is input to the first shaft TM1.

At the present state, the eighth shaft TM8 is operated as the fixed element by operation of the second brake B2. Therefore, the torque of the input shaft IS is shifted into the eighth forward speed, and the eighth forward speed is output through the output shaft OS fixedly connected to the second shaft TM2.

The second and third clutches C2 and C3 and the second brake B2 are operated at a ninth forward speed D9.

In a state that the third shaft TM3 is fixedly connected to the fourth shaft TM4 by operation of the second clutch C2 and the fifth shaft TM5 is fixedly connected to the sixth shaft TM6 by operation of the third clutch C3, the torque of the input shaft IS is input to the first shaft TM1.

At the present state, the eighth shaft TM8 is operated as the fixed element by operation of the second brake B2. Therefore, the torque of the input shaft IS is shifted into the ninth forward speed, and the ninth forward speed is output through the output shaft OS fixedly connected to the second shaft TM2.

The second and third clutches C2 and C3 and the first brake B1 are operated at a tenth forward speed D10.

In a state that the third shaft TM3 is fixedly connected to the fourth shaft TM4 by operation of the second clutch C2 and the fifth shaft TM5 is fixedly connected to the sixth shaft TM6 by operation of the third clutch C3, the torque of the input shaft IS is input to the first shaft TM1.

At the present state, the seventh shaft TM7 is operated as the fixed element by operation of the first brake B1. Therefore, the torque of the input shaft IS is shifted into the tenth forward speed, and the tenth forward speed is output through the output shaft OS fixedly connected to the second shaft TM2.

The third clutch C3 and the first and third brakes B1 and B3 are operated at a reverse speed REV.

In a state that the fifth shaft TM5 is fixedly connected to the sixth shaft TM6 by operation of the third clutch C3, the torque of the input shaft IS is input to the first shaft TM1.

At the present state, the seventh and ninth shafts TM7 and TM9 are operated as the fixed elements by operation of the first and third brakes B1 and B3. Therefore, the torque of the input shaft IS is shifted into the reverse speed, and the reverse speed is output through the output shaft OS fixedly connected to the second shaft TM2.

Figure 3:
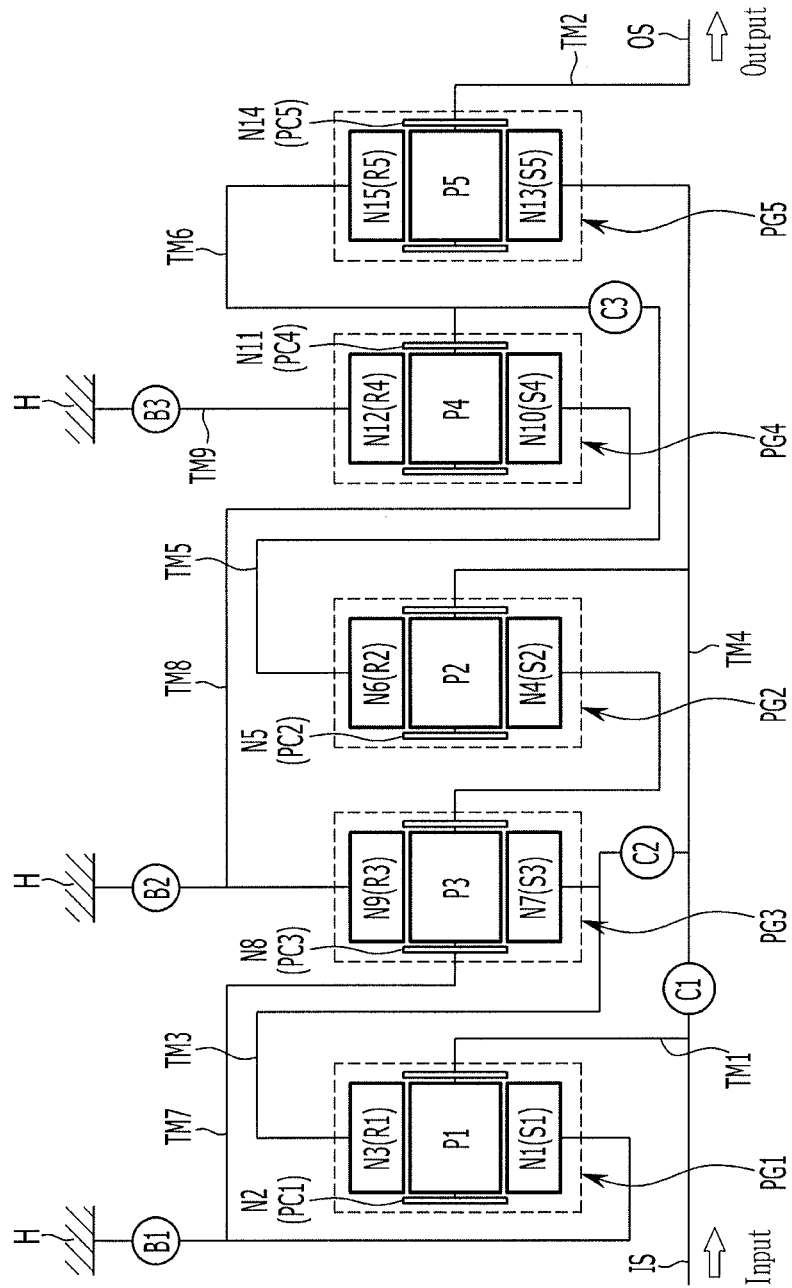
FIG. 3 is a schematic diagram of a planetary gear train according to various exemplary embodiments of the present invention.

FIG. 3 is a schematic diagram of a planetary gear train according to various exemplary embodiments of the present invention.

Layout and operation of a planetary gear train according to various exemplary embodiments of the present invention is very similar to those of the planetary gear train according to the various exemplary embodiments of the present invention. Therefore, differences between the various exemplary embodiments and the various exemplary embodiments will be described.

Referring to FIG. 1 and FIG. 3, the planetary gear sets are disposed in a sequence of the first, third, fourth, second, and fifth planetary gear sets PG1, PG3, PG4, PG2, and PG5 from the engine side on the axis of the input shaft IS in the planetary gear train according to the various exemplary embodiments of the present invention, but the planetary gear sets are disposed in a sequence of the first, third, second, fourth, and fifth planetary gear sets PG1, PG3, PG2, PG4, and PG5 from the engine side on the axis of the input shaft IS in the planetary gear train according to the various exemplary embodiments of the present invention.

According to the exemplary embodiments of the present invention, ten forward speeds and one reverse speed may be achieved by use of five planetary gear sets PG1, PG2, PG3, PG4, and PG5 and six engaging elements including three clutches C1, C2, and C3 and three brakes B1, B2, and B3.

Furthermore, since gear ratio span greater than 9.7 is secured, driving efficiency of the engine may be maximized. Furthermore, since linearity of step ratios may be secured due to multiple speed stages, drivability including acceleration before and after shift, rhythmical engine speed, and the like may be improved.

Furthermore, since ten forward speeds and one reverse speeds are achieved by use of the minimized number of engaging elements, drag loss of clutches and brakes may be reduced and power delivery efficiency and fuel economy may be improved.

Furthermore, since torque parallel way is applied to a planetary gear set at an output side and a torque is evenly shared to each planetary gear set and each engaging element, torque delivery efficiency and durability may be improved.

Furthermore, since five planetary gear sets are used to achieve ten forward speeds and one reverse speed, flexibility of output gear ratios may be increased and linearity of step ratios may be improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
a fifth planetary gear set including a thirteenth rotation element, a fourteenth rotation element, and a fifteenth rotation element;
a first shaft fixedly connected to the second rotation element and the input shaft;
a second shaft fixedly connected to the fourteenth rotation element and the output shaft;
a third shaft fixedly connected to the third rotation element and the seventh rotation element;
a fourth shaft fixedly connected to the fifth rotation element and the thirteenth rotation element;
a fifth shaft fixedly connected to the sixth rotation element;
a sixth shaft fixedly connected to the eleventh rotation element and the fifteenth rotation element;
a seventh shaft fixedly connected to the first rotation element, the fourth rotation element, and the eighth rotation element;
an eighth shaft fixedly connected to the ninth rotation element and the tenth rotation element; and
a ninth shaft fixedly connected to the twelfth rotation element.

2. The planetary gear train apparatus of claim 1, further including six engaging elements, each selectively connecting two shafts among the first to ninth shafts or one shaft among the first to ninth shafts with a transmission housing,
wherein forward speeds or reverse speeds are achieved by operating three engaging elements among the six engaging elements.

3. The planetary gear train apparatus of claim 2, wherein the six engaging elements comprise:
three clutches, each selectively connecting two shafts among the first to ninth shafts; and
three brakes, each selectively connecting one shaft among the first to ninth shafts which is not connected to the input shaft nor the output shaft with the transmission housing.

4. The planetary gear train apparatus of claim 2, wherein the six engaging elements comprise:
a first clutch mounted between the first shaft and the fourth shaft;
a second clutch mounted between the third shaft and the fourth shaft;
a third clutch mounted between the fifth shaft and the sixth shaft;
a first brake mounted between the seventh shaft and the transmission housing;
a second brake mounted between the eighth shaft and the transmission housing; and
a third brake mounted between the ninth shaft and the transmission housing.

5. The planetary gear train apparatus of claim 1, wherein the first rotation element is a first sun gear, the second rotation element is a first planet carrier, and the third rotation element is a first ring gear,
the fourth rotation element is a second sun gear, the fifth rotation element is a second planet carrier, and the sixth rotation element is a second ring gear,
the seventh rotation element is a third sun gear, the eighth rotation element is a third planet carrier, and the ninth rotation element is a third ring gear,
the tenth rotation element is a fourth sun gear, the eleventh rotation element is a fourth planet carrier, and the twelfth rotation element is a fourth ring gear, and
the thirteenth rotation element is a fifth sun gear, the fourteenth rotation element is a fifth planet carrier, and the fifteenth rotation element is a fifth ring gear.

6. The planetary gear train apparatus of claim 1, wherein the first, second, third, fourth, and fifth planetary gear sets are disposed in a sequence of the first, third, fourth, second, and fifth planetary gear sets from an engine side on an axis of the input shaft.

7. The planetary gear train apparatus of claim 1, wherein the first, second, third, fourth, and fifth planetary gear sets are disposed in a sequence of the first, third, second, fourth, and fifth planetary gear sets from an engine side on an axis of the input shaft.

8. A planetary gear train apparatus of an automatic transmission for a vehicle, the planetary gear train apparatus comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
a fifth planetary gear set including a thirteenth rotation element, a fourteenth rotation element, and a fifteenth rotation element;
a first shaft fixedly connected to the second rotation element and the input shaft;
a second shaft fixedly connected to the fourteenth rotation element and the output shaft;
a third shaft fixedly connected to the third rotation element and the seventh rotation element;
a fourth shaft fixedly connected to the fifth rotation element and the thirteenth rotation element;
a fifth shaft fixedly connected to the sixth rotation element;
a sixth shaft fixedly connected to the eleventh rotation element and the fifteenth rotation element;
a seventh shaft fixedly connected to the first rotation element, the fourth rotation element, and the eighth rotation element, and selectively connectable to a transmission housing;

an eighth shaft fixedly connected to the ninth rotation element and the tenth rotation element and selectively connectable to the transmission housing; and
a ninth shaft fixedly connected to the twelfth rotation element and selectively connectable to the transmission housing, and
wherein the first shaft is selectively connectable to the fourth shaft, the third shaft is selectively connectable to the fourth shaft, and the fifth shaft is selectively connectable to the sixth shaft.

9. The planetary gear train apparatus of claim 8, further including:
three clutches, each selectively connecting two shafts among the first to ninth shafts; and
three brakes, each selectively connecting one of the seventh shaft, the eighth shaft, and the ninth shaft to the transmission housing.

10. The planetary gear train apparatus of claim 9, wherein the three clutches comprise:
a first clutch mounted between the first shaft and the fourth shaft;
a second clutch mounted between the third shaft and the fourth shaft; and
a third clutch mounted between the fifth shaft and the sixth shaft, and
wherein the three brakes comprise:
a first brake mounted between the seventh shaft and the transmission housing;
a second brake mounted between the eighth shaft and the transmission housing; and
a third brake mounted between the ninth shaft and the transmission housing.

11. The planetary gear train apparatus of claim 8, wherein the first rotation element is a first sun gear, the second rotation element is a first planet carrier, and the third rotation element is a first ring gear,
the fourth rotation element is a second sun gear, the fifth rotation element is a second planet carrier, and the sixth rotation element is a second ring gear,
the seventh rotation element is a third sun gear, the eighth rotation element is a third planet carrier, and the ninth rotation element is a third ring gear,
the tenth rotation element is a fourth sun gear, the eleventh rotation element is a fourth planet carrier, and the twelfth rotation element is a fourth ring gear, and
the thirteenth rotation element is a fifth sun gear, the fourteenth rotation element is a fifth planet carrier, and the fifteenth rotation element is a fifth ring gear.

12. The planetary gear train apparatus of claim 8, wherein the first, second, third, fourth, and fifth planetary gear sets are disposed in a sequence of the first, third, fourth, second, and fifth planetary gear sets from an engine side on an axis of the input shaft.

13. The planetary gear train apparatus of claim 8, wherein the first, second, third, fourth, and fifth planetary gear sets are disposed in a sequence of the first, third, second, fourth, and fifth planetary gear sets from an engine side on an axis of the input shaft.

14. A planetary gear train apparatus of an automatic transmission for a vehicle comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element; and
a fifth planetary gear set including a thirteenth rotation element, a fourteenth rotation element, and a fifteenth rotation element,
wherein the second rotation element is fixedly connected to the input shaft,
the fourteenth rotation element is fixedly connected to the output shaft,
the first rotation element is fixedly connected to the fourth rotation element and the eighth rotation element, and selectively connectable to a transmission housing,
the third rotation element is fixedly connected to the seventh rotation element,
the fifth rotation element is fixedly connected to the thirteenth rotation element and selectively connectable to the second rotation element and the seventh rotation element,
the ninth rotation element is fixedly connected to the tenth rotation element and selectively connectable to the transmission housing,
the eleventh rotation element is fixedly connected to the fifteenth rotation element and selectively connectable to the sixth rotation element, and
the twelfth rotation element is selectively connectable to the transmission housing.

15. The planetary gear train apparatus of claim 14, further including:
three clutches, each selectively connecting two rotation elements among the first to twelfth rotation elements; and
three brakes, each selectively connecting one of the first rotation element, the ninth rotation element, and the twelfth rotation element to the transmission housing.

16. The planetary gear train apparatus of claim 15, wherein the three clutches comprise:
a first clutch mounted between the second rotation element and the fifth rotation element;
a second clutch mounted between the fifth rotation element and the seventh rotation element; and
a third clutch mounted between the sixth rotation element and the eleventh rotation element, and
wherein the three brakes comprise:
a first brake mounted between the first rotation element and the transmission housing;
a second brake mounted between the ninth rotation element and the transmission housing; and
a third brake mounted between the twelfth rotation element and the transmission housing.

17. The planetary gear train apparatus of claim 14, wherein the first rotation element is a first sun gear, the second rotation element is a first planet carrier, and the third rotation element is a first ring gear,
the fourth rotation element is a second sun gear, the fifth rotation element is a second planet carrier, and the sixth rotation element is a second ring gear,
the seventh rotation element is a third sun gear, the eighth rotation element is a third planet carrier, and the ninth rotation element is a third ring gear,
the tenth rotation element is a fourth sun gear, the eleventh rotation element is a fourth planet carrier, and the twelfth rotation element is a fourth ring gear, and the thirteenth rotation element is a fifth sun gear, the fourteenth rotation element is a fifth planet carrier, and the fifteenth rotation element is a fifth ring gear.

18. The planetary gear train apparatus of claim 14, wherein the first, second, third, fourth, and fifth planetary gear sets are disposed in a sequence of the first, third, fourth, second, and fifth planetary gear sets from an engine side on an axis of the input shaft.

19. The planetary gear train apparatus of claim 14, wherein the first, second, third, fourth, and fifth planetary gear sets are disposed in a sequence of the first, third, second, fourth, and fifth planetary gear sets from an engine side on an axis of the input shaft.

* * * * *